United States Patent [19]

Srna

[11] 4,065,875
[45] Jan. 3, 1978

[54] SELECTIVE DESTRUCTION OF CERTAIN ALGAE

[75] Inventor: Richard Frank Srna, Milton, Del.

[73] Assignee: University of Delaware, Newark, Del.

[21] Appl. No.: 724,411

[22] Filed: Sept. 17, 1976

[51] Int. Cl.² .............................................. A01G 9/00
[52] U.S. Cl. ........................................ 47/1.4; 119/2; 210/19; 47/DIG. 12
[58] Field of Search ............ 210/19; 47/1.4, DIG. 12, 47/58; 119/2.3, 4

[56] References Cited

U.S. PATENT DOCUMENTS

| | | | |
|---|---|---|---|
| 3,625,884 | 12/1971 | Waltrip | 210/19 |
| 3,630,377 | 12/1971 | Brooks | 210/19 X |
| 3,650,094 | 3/1972 | Goodwin | 210/19 X |
| 3,763,824 | 10/1973 | Schoon | 47/1.4 X |
| 3,902,273 | 9/1975 | Friedman | 47/58 |

*Primary Examiner*—Robert E. Bagwill
*Attorney, Agent, or Firm*—George W. Walker

[57] ABSTRACT

A process is described for the selective destruction of Phaeodactylum cells in the presence of Thallasiosira cells by subjecting algae culture liquid containing these species to ultrasonic waves.

1 Claim, 1 Drawing Figure

SELECTIVE DESTRUCTION OF CERTAIN ALGAE

BACKGROUND OF THE INVENTION

The Government of the United States has rights in this invention pursuant to Grant No. 04-3-158-30 from the Department of Commerce.

FIELD OF THE INVENTION

This invention relates to a method for purifying algae culture liquids by selectively destroying undesirable algae species.

DESCRIPTION OF THE PRIOR ART

In the mass culture of algae for use as nutrients for the feeding of shellfish, one genus, Phaeodactylum, is a troublesome contaminant. This has a rapid growth rate but it is not suitable for sustaining shellfish growth. Consequently the presence of this genus in algae cultures used as nutrients in mariculture systems is undesirable since it reduces the productivity of the algal culture medium containing it, and this in turn increases the cost of the nutrient supplied to shellfish growing systems.

It is therefore a major object of this invention to provide an effective method for destroying undesirable algal species in a mass algal culture system without destroying desired algal species.

Other objects of this invention will be apparent from the description of the invention given below.

It has been known for some time that ultrasonic waves have a deleterious effect on plant cells, bacteria and biological tissue. For example, plant cells and certain algae were found to be torn in pieces by ultrasonic waves ("Ultrasonics," by Ludwig Berman, translated by H. S. Hatfield, page 225, John Wiley and Sons, Inc., New York, 1944). The destruction of bacteria in suspension is also described on page 234 of "High Intensity Ultrasonics" by Brown and Goodman, D. Van Nostrand Co., Inc., Princeton, N.J., 1965.

SUMMARY OF THE INVENTION

The process of this invention comprises subjecting an algae culture for use as a nutrient for feeding shellfish to ultrasonic waves in order to destroy undesirable algae particularly the Phaeodactylum algae cells. Preferably the process of this invention comprises subjecting such algae culture liquid flowing through an algae culture system to the action of ultrasonic waves. It has been found that ultrasonic waves act selectively on algae cultures containing both Thallasiosira and Phaeodactylum algae cells to destroy the latter without destroying a significant number of the former. This is a significant advance in the art of cultivating marine algae for use as nutrients for shellfish, since as indicated hereinbefore, Phaeodactylum is a troublesome contaminant that does not sustain growth of shellfish. On the other hand, Thallasiosira is a highly desirable algae for feeding shellfish in mariculture systems.

The ultrasonic waves used in the process of this invention can be generated by conventional ultrasonic generators commercially available. The ultrasonic waves can be applied to the circulating algae culture liquid at various places in the culture system. For example, in the two-loop algae culture system described below in reference to the drawing, the ultrasonic wave generator can be placed in the tube carrying the entire incoming algae culture liquid. Alternatively, the ultrasonic wave generator can be placed in the algae culture seed loop alone, or in the algae mass culture loop alone, or in both. The ultrasonic waves can be applied to the algae culture liquid continuously or intermittently as desired. Ultrasonic wave generators capable of providing waves of 20,000 cycles per second are satisfactory for use in the process of this invention. However, waves of higher or lower frequency can also be employed.

Figure 1:
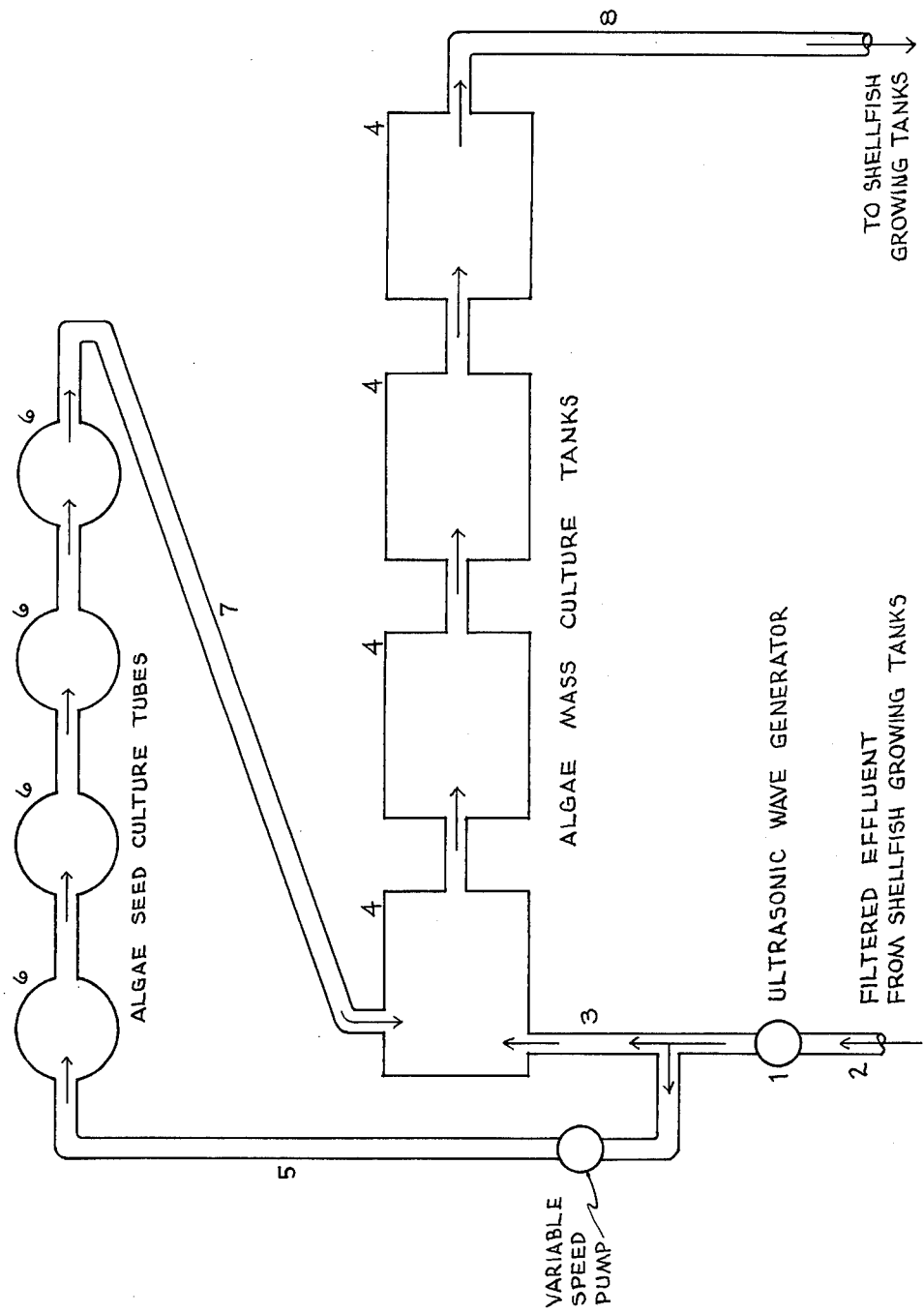
FIG. 1 is a schematic flow sheet of one embodiment of the process of this invention.

In this embodiment the ultrasonic waves produced by the generator 1, are applied to the entire algae culture liquid entering the two-loop algae culture system at 2. The major portion of the treated culture liquid then passes through tube 3 to a series of interconnected mass algae culture tanks 4, and a minor proportion of the treated culture liquid passes through tube 5 to a series of seed algae culture tubes 6, and then is returned through tube 7 to the first of the mass culture tanks 4. The effluent from the last of the mass culture tanks is returned through tube 8 to the shellfish growing tanks.

In other embodiments of the invention the ultrasonic wave generator can be placed in tubes 3 or 5, or both, if desired.

Other types of contaminants in the algae culture liquid besides Phaeodactylum are destroyed by ultrasonic waves. For example, bacteria, viruses and larval pests are destroyed by the ultrasonic wave treatment of this invention.

It is apparent that changes and modifications may be made herein without departing from the invention in its broadest aspects. The aim of the appended claims therefore is to cover all such changes and modifications as fall within the true spirit and scope of the invention.

I claim:

1. In a process for the culture of Thallasiosira algae cells for use as a nutrient for feeding of shellfish, the improvement which comprises passing the culture liquid containing the Thallasiosira through a zone in which ultrasonic waves of the order of 20,000 cycles per second are generated in order to destroy any Phaeodactylum algae cells that may be present.

* * * * *